United States Patent [19]

Hashiguchi et al.

[11] Patent Number: 4,761,697
[45] Date of Patent: Aug. 2, 1988

[54] CASSETTE LOADING MECHANISM OF MAGNETIC RECORDING AND REPRODUCING APPARATUS

[75] Inventors: Yasuhiro Hashiguchi, Katsuta; Noboru Katono, Mito; Yoshihiro Shibata, Katsuta, all of Japan

[73] Assignee: Hitachi, Ltd., Tokyo, Japan

[21] Appl. No.: 917,975

[22] Filed: Oct. 14, 1986

[30] Foreign Application Priority Data

Oct. 11, 1985 [JP] Japan .................. 60-226399

[51] Int. Cl.$^4$ .................. G11B 15/66; G11B 15/18
[52] U.S. Cl. .................. 360/96.5; 360/96.3
[58] Field of Search .................. 360/96.5, 96.3, 95, 360/85, 93

[56] References Cited

U.S. PATENT DOCUMENTS 4,423,445 12/1983 Okada et al. .................. 360/96.5

FOREIGN PATENT DOCUMENTS 55-84069 6/1980 Japan .................. 360/96.5
59-52451 3/1984 Japan .................. 360/96.5
2156141 10/1985 United Kingdom .................. 360/96.5

Primary Examiner—John H. Wolff
Assistant Examiner—Matthew J. Bussan
Attorney, Agent, or Firm—Antonelli, Terry & Wands

[57] ABSTRACT

In a cassette loading apparatus for a video tape recorder equipped with a front loading mechanism, bearing portions of a worm are disposed at predetermined positions in side brackets for supporting a cassette holder which have L-shaped guide holes for guiding the support shaft of the cassette holder in both horizontal and vertical directions, a reference hole is bored on the base of the video tape recorder, a shaft of the worm is inserted through the bearing portions and the reference hole, and the worm shaft keeps constant the axial distance between gears for a cassette loading mechanism and a driving gear for driving the video tape recorder.

3 Claims, 3 Drawing Sheets

CASSETTE LOADING MECHANISM OF MAGNETIC RECORDING AND REPRODUCING APPARATUS

BACKGROUND OF THE INVENTION

This invention relates to a cassette loading mechanism for a magnetic recording and reproducing apparatus such as a video tape recorder. The cassette loading mechanism of the present invention is particularly suitable for a motor drive type cassette loader or so-called "front loading type cassette loader" which first moves horizontally a cassette holder for holding a cassette and then vertically such holder by use of the driving force of a motor.

Such a front loading type cassette holder (hereinafter called the "front loading mechanism") is constructed as shown in FIGS. 4 and 5 of the accompanying drawings.

FIG. 4 is a perspective view of a conventional front loading mechanism and FIG. 5 is its right side view.

As shown in these drawings, the front loading mechanism includes a cassette holder 12 between right and left side brackets 2 and 3, and the cassette holder 12 are supported by guide holes 2a, 2b and 3a, 3b formed on the right and left side brackets 2 and 3, respectively. Reference numeral 11 represents a motor for front loading only, and the driving force of the motor is transmitted to a gear 9 through a worm 10 which rotates integrally with the drive shaft of the motor 11, and further from gear 9 to a gear 8. A sheet-like projection member 13 having an elongated hole 13a is fixed to a rotary shaft of the gear 8, and a cassette holder support portion 12a penetrates through, and meshes with, this elongated hole 13a. The cassette holder support portion 12a penetrates through the guide hole 2a formed on the right side bracket 2. Another cassette holder support portion 12b is inserted through the guide hole 2a. Reference numeral 14 represents cassette guide frames that are fitted to the right and left brackets 2, 3.

Now, when the cassette 1 is fitted and loaded into the cassette holder 12 from a direction represented by an arrow in FIG. 4, a detection switch (not shown) is turned on by the movement of the cassette holder 12. In consequence, the motor 11 is actuated and its driving force is transmitted to the gear 8 through the worm 10 and the gears 9, 9'. When the gear 8 rotates clockwise, the sheet-like projection member 13 rotates in the same direction, too, whereby the cassette holder 12 receives the force in the right ward direction from the sheet-like projection member 13 and is conveyed horizontally to the inner part while holding the cassette 1 and being guided by the guide holes 2a, 2b and 3a, 3b. When the cassette holder 12 moves a predetermined distance in the horizontal direction, it is conveyed downwardly in the vertical direction while being guided by the vertical portions of the guide holes 2a, 2b and 3a, 3b.

When the cassette 1 is loaded to a predetermined position in the manner described above, a magnetic tape (not shown) stored in the cassette 1 is pulled out by a tape loading mechanism (not shown) of VTR (Video Tape Recorder) and is wound on a cylinder (not shown) supporting thereon recording and reproducing heads. Thereafter, recording and reproduction to and from the magnetic tape are made.

Since the front loading mechanism described above includes the motor 11 for front loading only, the mechanism is large in size and high in cost of production.

Therefore, a front loading mechanism which eliminates the driving source for front loading only and utilizes the power source (for example, a motor for driving capstans) of a magnetic recording and reproducing apparatus also for front loading has been proposed. However, the front loading mechanism of this type has the following problems.

First of all, when the driving force is transmitted to the front loading mechanism from the magnetic recording and reproducing apparatus, a rubber belt or gears are used as a power transmission member. In the case of the former, however, belt fitting work becomes necessary after the assembly of the front loading mechanism to the magnetic recording and reproducing apparatus, and this method is not very suitable for reducing the number of production steps and for easy service maintenance in the field.

In the case of the gears, the problem described immediately above does not exist, but deviation of the distance between shafts for the gears depends on accurate fitting. If setting of the distance between the gear shafts is not good, defective operation of the cassette and escape of the gear teeth will occur. Since the hands of people come into direct contact with the front loading mechanism, unexpectedly great force is likely to act upon the front loading mechanism, and for this reason, the accuracy of spacing must be secured. Furthermore, the gears must mesh correctly with one another at the time of the assembly of the front loading mechanism.

As a prior art reference relating to the apparatuses of this kind, mention can be made of Japanese Patent Laid-Open No. 171065/1984.

SUMMARY OF THE INVENTION

It is therefore an object of the present invention to provide a cassette loading mechanism which eliminates the problems of the prior art technique described above, can fit the gears on the side of the front loading mechanism and the driving gear of the magnetic recording and reproducing apparatus while securing a correct gear shaft distance in such a manner as not to be affected by a fitting error of the front loading mechanism, and does not need a driving source for front loading only.

To accomplish the object described above, the cassette loading mechanism in accordance with the present invention includes a cassette holder for storing a tape cassette; a bracket for storing the cassette holder, equipped with guide holes for guiding the cassette holder in both horizontal and vertical directions, and with bearing portions; cassette holder driving means including a gear for driving the cassette holder along the guide holes of the bracket; a driving force source; gear means having a plurality of gears rotated upon receiving the driving force from the driving force source; a base equipped with support shafts for supporting the gears of the gear means and with a fitting position reference hole; and rotation transmission means for transmitting the rotating force of the gears of the gear means to the cassette holder driving means; the rotation transmission means including a shaft supported by the bearing portions of the bracket and inserted through the reference hole of the base, a first rotation transmission gear fitted to the shaft and meshing with the gears of the gear means, and a second rotation transmission gear fitted to the shaft and meshing with the gear of the cassette holder driving means.

DESCRIPTION OF THE PREFERRED EMBODIMENT

Figure 1:
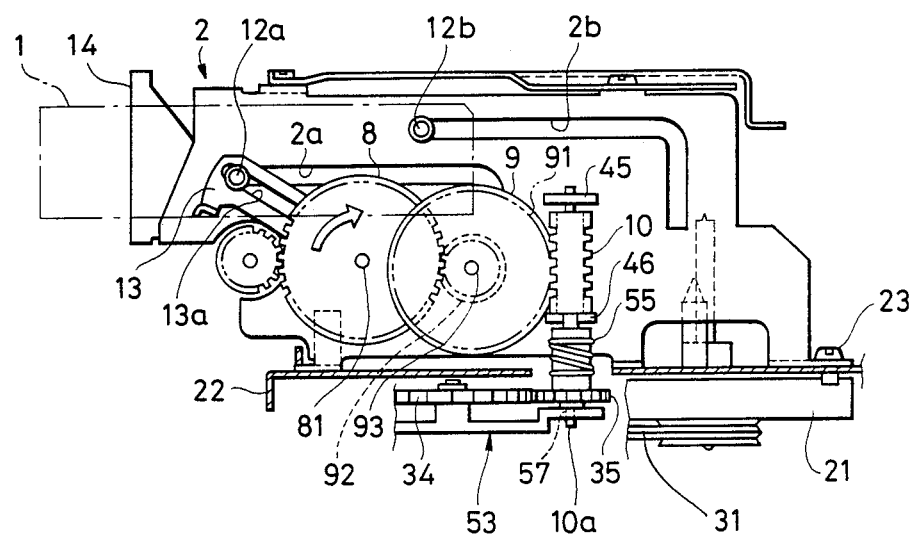
FIG. 1 is a right side view of one embodiment of the present invention.
Figure 2:
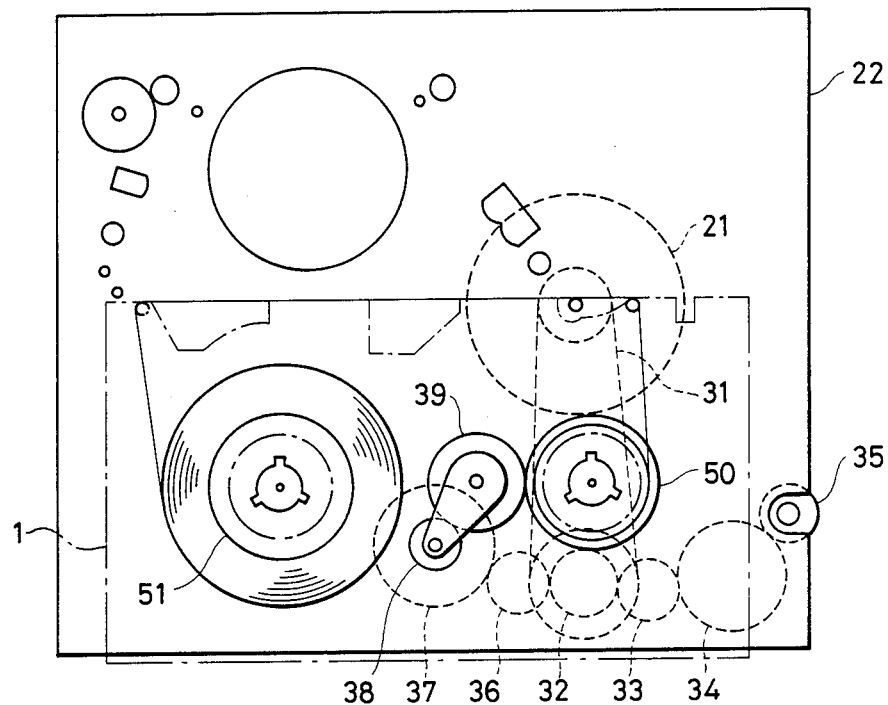
FIG. 2 is a plan view of FIG. 1.
Figure 3:
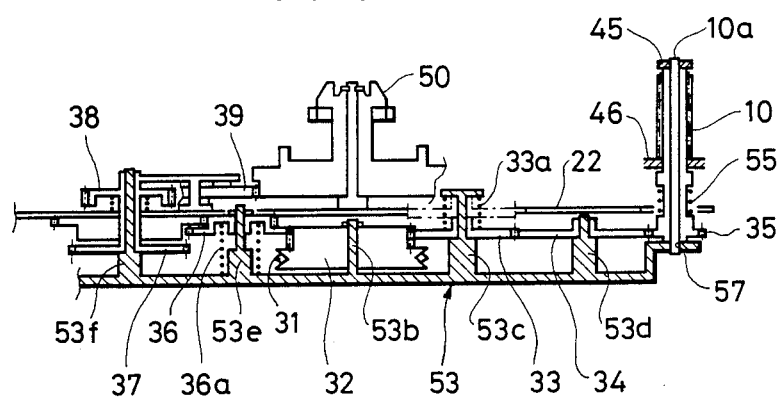
FIG. 3 is a sectional view of a base and a main chassis of FIG. 2.

Hereinafter, one preferred embodiment of the invention will be described. FIG. 1 is a right side view of the front loading mechanism in accordance with one embodiment of the invention, FIG. 2 is a plan view of a magnetic recording and reproducing apparatus to which the front loading mechanism of one embodiment of the invention is fitted, and FIG. 3 is a partial sectional view of FIG. 2.

Figure 4:
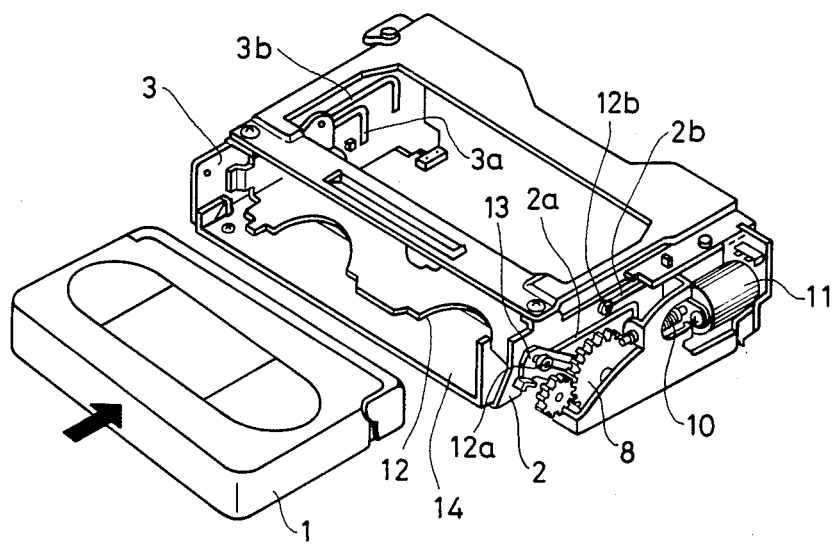
FIG. 4 is a perspective view of a conventional prior art front loading mechanism.
Figure 5:
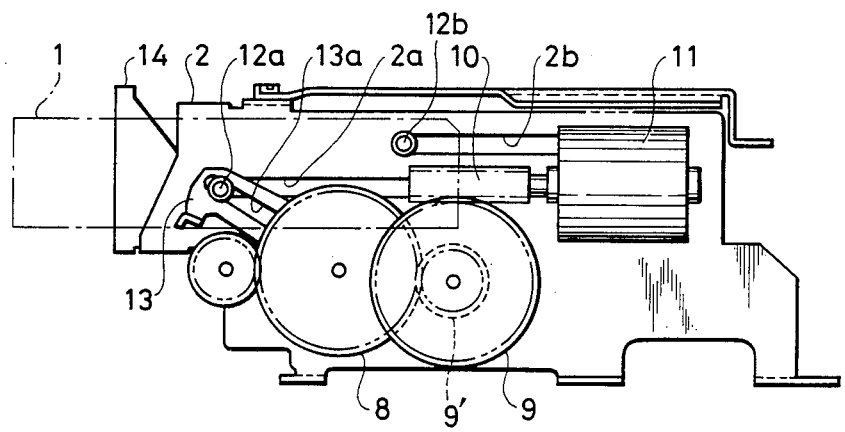
FIG. 5 is a right side view of FIG. 4.

In FIG. 1, reference numeral 2 represents the right side. A similar bracket (not shown) is used for the left side. Guide holes 2a, 2b are formed on the right side bracket 2 to move a cassette holder 12 both horizontally and vertically. Two bearing portions 45 and 46 are disposed on the right side bracket 2 and support a worm 10. These bearing portions 45, 46 are set so that the relation of position between the worm 10 and a driving gear 9 satisfies a predetermined relation of position. A sheet-like projection member 13 having an elongated hole 13a is fixed to a rotary shaft 81 of a gear 8 that meshes with a small gear 92 fixed to a rotary shaft 93 of the driving gear 9, in the same way as in the prior art apparatuses (FIGS. 4 and 5). Accordingly, the sheet-like projection member 13 rotates in the same direction as the gear 8 and integrally therewith. In other words, driving gear 9, gear 8 and sheet-like projection member 13 constitute the cassette holder 12 driving mechanism.

Support portions 12a, 12b of the cassette holder 12 are supported by the guide holes 2a, 2b, respectively. Furthermore, the support portion 12a penetrates through, and meshes with, the elongated hole 13a of the sheet-like projection member 13 and is moved both horizontally and vertically along the elongated hole 13a as the projection member 13 rotates.

Reference numeral 53 represents a base which will be described in further detail with reference to FIG. 3. One of the ends of a shaft (center shaft) 10a for the worm 10 is inserted through a reference hole 57 which is formed on the base 53 and serves as a reference hole when the front loading mechanism is assembled. A gear 35 is disposed between the bearing portion 46 and the base 53 in which the reference hole 57 is formed. This gear 53 is movable in the longitudinal (axial) direction of the shaft 10a and rotates integrally with the shaft. A compression spring 55 is fitted between the gear 35 and the worm 10. Accordingly, the gear 35 is always urged towards the base 53 and always meshes with a gear 34 supported by the base 53.

When the shaft 10a of the worm 10 is inserted through the bearing portions 45, 46 formed on the right side bracket 2 and then through the reference hole 57 of the base 53, the relation of position between the right side bracket 2 and the base 53 can be set to a predetermined relation of position.

Reference numeral 22 represents a main chassis which can be best seen from in FIG. 2. Looking at FIG. 1, the right side bracket 2 is fixed at a predetermined position on the chassis 22 by a screw 23 with the reference hole 57 of the base 53. A capstan motor 21 is fixed on the lower surface of the main chassis 22. Reference numeral 31 represents a rubber belt which transmits power from the capstan motor 21 to other members. Since this belt can be stretched before the assembly of the front loading mechanism to the magnetic recording and reproducing apparatus as will be described elsewhere, the number of production steps in a production plant can be reduced.

FIG. 2 is a plan view of the magnetic recording and reproducing apparatus and FIG. 3 is a sectional line along a line that cuts the support shafts for the worm 10, gears 34, 33, 32, 36 and 37 in FIG. 2.

As can be seen clearly in FIG. 3, the reference hole 57 and the shafts 53b–53f of the gears 32, 33, 34, 36 and 37 are disposed integrally on the base 53. The rubber belt 31 is stretched between the capstan motor 21 and the gear 32 to transmit the driving force of the capstan motor 21 to the gear 32.

The gear 33 is supported movably in the axial direction of the support shaft 53c and is urged unidirectionally by the spring 33a wound around the support shaft. The urging direction of the gear 33 is changed over by an arm not shown in the drawing.

In other words, when the cassette 1 is loaded and unloaded, the gear 33 is urged downward as shown in solid lines in the drawing, and thus the force of the driving capstan motor 21 is transmitted to the gear 34 through the gear train 32, 33. On the other hand, at the time of fast-forward (FF) and rewind (REW) operations after completion of loading of the cassette 1 and at the time of recording and reproduction, the gear 33 is urged upward by the arm, so that the drive force transmission route of the gear train 32, 33, 34 is cut off.

The gear 36 is ordinarily urged upward by the spring 36a. Therefore, the rotation of the gear 36 is transmitted to the gear 37 through the force of friction at the time of loading and unloading of the cassette 1. At the time of the FF and REW operations of the magnetic tape, however, the gear 36 is urged downward by an arm, not shown, and meshes with the gear 37.

A small gear 38 fixed coaxially with the gear 37 meshes always with a gear 39, and the gear 39 is caused to swivel in the rotating direction of the small gear 38 due to the rotation of the latter (38). Accordingly, when the small gear 38 rotates clockwise as shown in FIG. 2, the gear 39 is caused to swivel in the same direction and meshes with a reel table 50. As a result, the force of the gear 39 is transmitted to the reel table 50 and the latter rotates clockwise. When the small gear 38 rotates counter-clockwise, on the other hand, the gear 39 is caused to swivel and to mesh with another reel table 51. As a result, the force is transmitted to the reel table 51 through the gear 39 and the reel table 51 rotates counter-clockwise.

Next, the operation of this embodiment will be described. When the cassette 1 is loaded, the gear 33 is urged downward as shown in FIG. 3. When the cassette 1 is inserted into the cassette holder 12, the detection switch, which is not shown in the drawing, is turned on and the capstan motor 21 starts rotating. The rotation of this capstan motor 21 is transmitted to the gear 35 rotating integrally with the worm 10 of the front loading mechanism through the rubber belt 31 and the gear trains 32, 33, 34. When the worm 10 is rotated due to the rotation of the gear 35, the gears 91, 92 of the driving gear 9 shown in FIG. 1 rotate counter-clockwise and the gear 8 meshing with the former rotates in the direction of arrow in the drawing. At the same time, the sheet-like projection member 13 rotates clockwise. This rotation in turn moves the support portions 12a, 12b of the cassette holder 12 along the guide holes 2a, 2b, so that the cassette holder 12 is transferred horizontally and then vertically. When this vertical movement is made to a predetermined position, the cassette loading operation is complete.

When the cassette 1 is unloaded, the capstan motor 21 rotates in the direction opposite to the above, so that the unloading operation of the cassette 1 is executed.

The driving force in the reel driving direction is transmitted selectively to the reel table 50 or 51 by a similar interruption mechanism through the gear train 32, 36, 37, 38 and 39. However, transmission of the driving force is not the subject matter of the present invention and can be effected in the same way as in the prior art apparatuses. Therefore, its explanation is hereby omitted.

Incidentally, since the loading and unloading operations of the cassette 1 and all the modes relating to the tape travel such as FF, REW, recording/reproduction and the like are effected in series timewise, there occurs no problem in the rotation of the capstan motor 21.

The above explains the construction and operation of this embodiment. Next, assembly of the front loading mechanism of this embodiment to the magnetic recording/reproducing apparatus and a locating method of the front loading mechanism will be explained.

The front loading mechanism is assembled to the main chassis 22 of the VTR in the direction of sheet of drawing of FIG. 2. The worm 10 for driving the front loading mechanism and the gear 35 rotating integrally with the worm 10 are supported by the bearing portions 45, 46 that are positioned at the upper and lower portions of the right side bracket 2 as shown in FIG. 1. Since these bearing portions 45, 46 are arranged in such a manner that the worm 10 and the driving gear 9 satisfy a predetermined relation of position, any deviation does not occur in the distance between the worm 10 and the driving gear 9 and they mesh with each other completely.

On the other hand, the support shafts 53b–53f of the train of gears 32, 33, 34, 36, 37 and 38 inside the VTR are all formed integrally on the base 53. The reference hole 57 for supporting the shaft of the worm 10 of the front loading mechanism is formed at the right-side end of the base, and serves as the reference when the front loading mechanism is assembled. The reference hole 57 and one other point, not shown, are used as the reference points of assembly of the right side bracket 2, which is fixed to the main chassis 22 by screws while being located to the reference hole 57 and the one other point.

In other words, when the shaft 10a of the worm 10 is passed through the reference hole 57 on the base 53, the torque transmission route for driving the cassette 1 is completed from the capstan motor 21 through the gears 32, 33, 34 and 35 and through the worm 10 while keeping the gear gaps at a predetermined high level of accuracy.

In addition, since the gear 35 is movable in the axial direction and the compression spring 55 is interposed between the gear 35 and the worm 10, the ger 35 is always urged downward or in the meshing with the gear 34. For this reason, when the front loading mechanism is assembled from one direction of the sheet of drawing of FIG. 2, the gears 34 and 35 can be engaged with each other immediately after the start of the gear 34 even if the gears 34 and 35 do not mesh with each other. Accordingly, the check of engagement at the time of assembly becomes unnecessary.

For the reasons described above, an automatic assembly robot can be introduced into a production plant and the number of production steps can be reduced. Furthermore, the front loading mechanism can be removed and assembled once again easily and rapidly in field service.

The embodiment described above uses the capstan motor as the driving source of the front loading mechanism. However, all the motors inside the VTR such as a motor for loading a magnetic tape, a motor for driving the reel tables, a motor for driving a cylinder, and the like, can be used as the driving source. For, the front loading operation assumes the relation which is cut off from the tape modes such as FF, REW, recording and reproduction, and the driving source can be obtained easily through a suitable interruption mechanism.

What is claimed is:

1. A cassette loading mechanism for a magnetic recording and reproducing apparatus comprising:
   a cassette holder for storing a tape cassette, said holder being equipped with support portions on both sides thereof;
   a bracket for storing said cassette holder, said bracket being equipped with guide holes in both sides thereof for guiding said cassette holder from a first position to a second position and with bearing portions on one side thereof, said support portions of said cassette holder being inserted in and supported by said guide holes of said bracket, respectively;
   cassette holder moving means for moving said cassette holder from said first position to said second position, said moving means including first gear means having at least one gear disposed near said bearing portions of said bracket, and a driving member moved upon receiving the rotating force of said at least one gear of said first gear means and driving one of said support portions of said casseteholder so as to move said support portions of said cassette holder along said guide holes of said bracket;
   a driving force source;
   second gear means including at least one gear rotated upon receiving the driving force from said driving force source;
   a base provided separately from said bracket, said base being equipped with at least one shaft for supporting said at least one gear of said second gear means and said base further provided with a fitting position reference hole for determining a relative position of said first gear means to said second gear means; and
   rotation transmission means for transmitting the rotating force of said at least one gear of said second gear means to said at least one gear of said first gear means, said rotation transmission means including a shaft which is supported by said bearing portions of said bracket and one end of which is inserted through said reference hole of said base, a first rotation transmission element fitted to said shaft and meshing with said at least one gear of said second gear means, and a second rotation transmission element fitted to said shaft and meshing with said at least one gear of said first gear means, wherein said at least one gear of said first gear means is coupled to at least one gear of said second gear means through said second and first rotation transmission elements by inserting said one end of said shaft supported by said bearing portions of said bracket through said reference hole of said base.

2. A cassette loading mechanism for a magnetic recording and reproducing apparatus as defined in claim 1, wherein said first rotation transmission element of said rotation transmission means is fitted to said shaft in a movable manner in the axial direction of said shaft, and said rotation transmission means further includes a resilient member for urging said first rotation transmission element in a direction meshing with said at least one gear of said second gear means.

3. A cassette loading mechanism for a magnetic recording and reproducing apparatus as defined in claim 1, wherein said driving force source is fixed to said base.

* * * * *